May 24, 1960   R. H. BETER ET AL   2,938,196
ELECTRICAL SYSTEM
Filed Feb. 6, 1956

INVENTORS
RALPH H. BETER
ERWIN L. NEWMAN
BY
ATTORNEY

United States Patent Office 2,938,196
Patented May 24, 1960

2,938,196
ELECTRICAL SYSTEM

Ralph H. Beter and Erwin L. Newman, Philadelphia, Pa., assignors to Philco Corporation, Philadelphia, Pa., a corporation of Pennsylvania Filed Feb. 6, 1956, Ser. No. 563,625
5 Claims. (Cl. 340—253)

The present invention relates to indicator circuits and more particularly to visual indicator circuits employing gaseous discharge devices as the indicating elements.

Visual indicators are employed in digital computers to identify that circuits or portions of circuits are energized or not energized. For example, binary computers employ a plurality of bi-stable circuits in register circuits and the like. Visual indicators may be employed to indicate which half of the bi-stable circuit is energized. A gaseous discharge device is a convenient indicator since it gives a usable visual signal with relatively low power drain. No problem is encountered in connecting gaseous discharge devices of the diode type to bistable circuits employing vacuum tubes. In many instances the gaseous discharge devices can be connected in parallel with the anode paths of the bis-table circuits with little or no change in the rest of the circuit. However, problems arise if the connection of gaseous discharge devices to transistor circuits is attempted. Transistor circuits operate from a supply potential of only a few volts. A typical neon diode discharge device, hereinafter also called an indicator, requires a striking potential of the order of 70 volts and has an extinction potential of the order of 50 to 60 volts. Thus the neon indicator cannot be connected directly to bistable circuits employing transistors. Another problem that arises is that the 70 volts striking potential and the 50 to 60 volt extinction potential required for a typical neon indicator are greater than the maximum voltage that may be applied safely across most commercial transistors. In the conventional gaseous diode indicator circuits either the full striking potential or a potential at least equal to the extinction potential appears across the switching element associated with the indicator. Therefore it is not possible to employ a single transistor as the switching element in conventional indicator circuits.

In certain instances it is desirable to provide two indicators for a single circuit, one of which indicates that the circuit is in a preselected energized state and the other of which indicates that the circuit is not in that state. In the past this has required a switching circuit associated with each of the two indicators.

It is an object of the present invention to provide a novel visual indicator circuit employing gaseous discharge devices as the indicating elements.

It is a further object of the present invention to provide a novel gaseous discharge indicating circuit which employs a single transistor as the switching element.

It is a further object of the invention to provide a novel indicating circuit in which two diode gaseous discharge devices or indicators are controlled by a single switching element.

In general, these and other objects of the invention are achieved by including a diode gaseous discharge device in a series circuit which also includes a plurality of resistive impedances. This series circuit is connected between two terminals of a source of potential. The switching means, which may be a transistor, is connected between one point on the series circuit and a point which is at a selected potential intermediate to the potentials of the terminals of said source. The point on the series circuit is so selected that when said switch is closed, the potential across the branch of the circuit between said switch and one terminal of said source, and including said gaseous discharge device, is not sufficient to maintain conduction through said gaseous discharge device and such that the impedance in the other branch of the series circuit between said switch and the other terminal of said source is sufficient to limit the current through said switch to a safe value. If a second indicator is employed to indicate that the switch is closed, the second indicator is connected in a second series circuit including at least one resistive impedance. This second series circuit is connected between one terminal of said source and a point on said series circuit which is above the striking potential of the second indicator when said first indicator is not conducting, and which is below the extinction potential for said second series circuit when said first indicator is conducting.

For a better understanding of the invention together with other and further objects thereof, reference should now be made to the following detailed description which is to be read in conjunction with the accompanying drawings in which.

Figure 1:
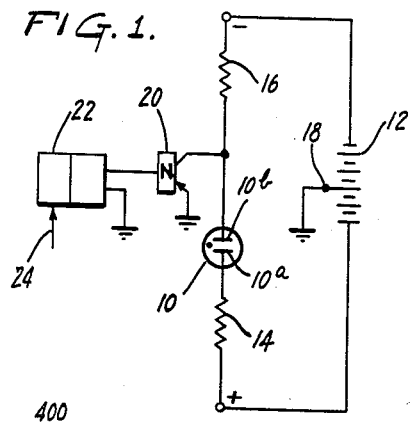
Fig. 1 is a schematic diagram of a preferred embodiment of the invention employing a single indicator.

In Fig. 1 the gaseous discharge device or indicator is shown at 10. One electrode 10a of indicator 10 is connected to the positive terminal of a supply source 12 through a resistor 14. The other electrode 10b of indicator 10 is connected to the negative terminal of source 12 through a resistor 16. An intermediate terminal 18 of source 12 is connected to ground. Source 12 is shown as a battery in Fig. 1 but a rectifier circuit having an intermediate point grounded may be substituted therefor. Electrode 10b of indicator 10 is connected to the collector of a transistor 20. The emitter of transistor 20 is connected to ground. The base of transistor 20 is connected to the circuit to be sensed. This circuit is represented in Fig. 1 by the block 22. The indicator circuit of Fig. 1 is actuated by a change in potential at the base of transistor 20. Thus the circuit represented by block 22 may be a bi-stable circuit which is caused to change from one stable state to another by a signal supplied at input 24. Possible alternatives for the circuit represented by block 22 are a pair of relay contacts, a simple switch or an amplifier circuit which is alternately biased above and below cut off potential.

The operation of the system of Fig. 1 depends upon the following characteristics of diode gaseous discharge devices. No conduction will take place through a gas diode which is not conducting until the potential between the electrodes has been raised to a value known as the striking potential. At this potential conduction begins. The source of potential must include a minimum value of internal impedance to prevent the discharge device or indicator from destroying itself once conduction begins. Once conduction starts the potential across the indicator will fall to a value somewhat lower than the striking potential. The potential across the conducting diode varies only slightly for relatively large changes in current therethrough. However, if the voltage is decreased sufficiently, a point is reached where conduction ceases. The voltage at which conduction ceases is known as the extinction voltage.

The circuit of Fig. 1 operates in the following manner. The position of tap 18 on source 12 is so selected that the potential between terminal 18 and the negative terminal of source 12 is not greater than the maximum voltage that may be placed safely across the transistor 20. However, the potential between terminal 18 and the negative terminal of source 12 must be at least equal to the difference between the striking voltage of indicator 10 and the extinction voltage of this indicator. Resistor 16 is selected to have a value which will limit the current through the transistor 20 to a small safe value when its base is energized. Resistor 14 is selected to have a value which will limit the current through indicator 10 to a safe value. Both resistor 14 and resistor 16 tend to limit the current through indicator 10. Therefore the value of resistor 16 may be taken into account when selecting the value for resistor 14. In a typical circuit employing an NE51 neon indicator lamp and a 2N47 transistor, resistor 16 may have a value of 10,000 ohms and resistor 14 a value of 75,000 ohms. The potential at the negative terminal of source 12 may be approximately 40 volts and the potential at the positive terminal may be approximately 45 volts, both measured with respect to ground.

With the circuit values given above, a potential of −0.35 volt on the base of transistor 20 is sufficient to extinguish gaseous discharge device 10. If the voltage on the base of transistor 20 is reduced to approximately zero, device 10 will conduct and provide the usual visual indication. With the base of transistor 20 at approximately ground potential, the transistor 20 presents a high impedance between emitter and collector. Therefore very little current flows in the collector connection of transistor 20. If device 10 is extinguished, so that no current flows through resistors 14 and 16, the potential applied between electrodes 10a and 10b of indicator 10 will be the full potential of source 12 which, in the case mentioned above, is approximately 85 volts. This voltage is above the striking potential of an NE51 indicator lamp and conduction occurs through device 10. Conduction through device 10 will produce a voltage drop across resistors 16 and 14 but this drop is not sufficient to drop the potential across device 10 to the extinction potential.

If the base of transistor 20 is now made negative, a low impedance is presented between the collector and emitter. Therefore the potential of electrode 10b is reduced to approximately ground or zero potential as a result of the flow of current from the negative terminal of source 12 through resistor 16 to the collector of transistor 20. The potential between electrode 10b and the positive terminal of source 12 is no longer sufficient to maintain conduction through indicator 10. Therefore conduction through indicator 10 will cease and the visual indication provided thereby will be removed.

Figure 2:
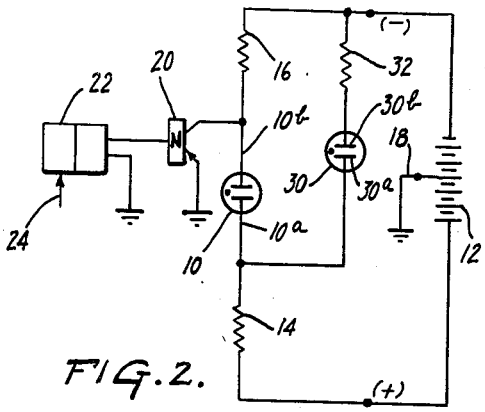
Fig. 2 is a schematic diagram of an indicator circuit employing two indicators energized from a direct current source.

The circuit shown in Fig. 2 is similar to the circuit shown in Fig. 1 except that a second indicator 30 has been added. Electrode 30b of indicator 30 is connected to the negative terminal of source 12 through a resistor 32. The other electrode 30a of indicator 30 is connected to electrode 10a of indicator 10. The circuit of Fig. 2 makes use of the fact that there is a finite difference between the striking potential, the operating potential and the extinction potential of diode gaseous discharge devices. Resistors 14 and 32 are so chosen that the operating potential of indicator 30 plus the voltage drop across resistor 32 resulting from the flow therethrough of the operating current of indicator 30 is greater than the striking potential of indicator 10. The further limitation is placed on resistor 32 that the voltage drop across resistor 32, resulting from the flow of current therethrough equal to the extinction current of indicator 30, is greater than the difference between the operating potential of indicator 10 plus the drop across resistor 16 and the extinction potential of indicator 30. If these conditions are met indicator 10 will always strike if transistor 20 is presenting a high impedance and conduction will cease through indicator 30 if conduction occurs through indicator 10.

The further limitations are placed on the circuit of Fig. 2 that the potential between electrode 10b and the positive terminal of source 12, when the base of transistor 20 is energized with a negative potential, must be less than the value which will sustain conduction through indicator 10 and resistor 14.

Figure 3:
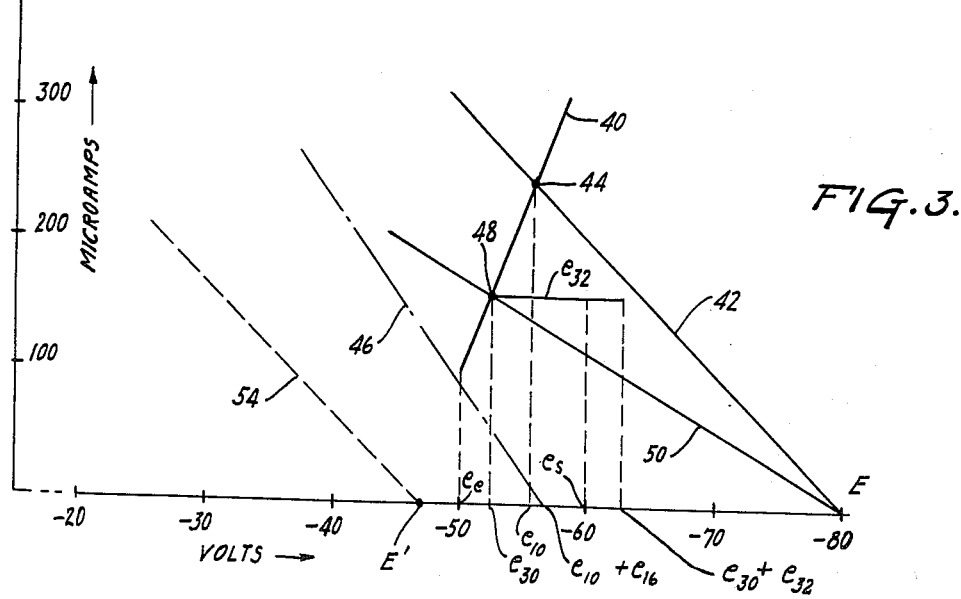
Fig. 3 is a plot of current versus voltage for the circuit of Fig. 2.

The relationships described above are shown in diagrammatic fashion in Fig. 3. Fig. 3 is a plot of current versus voltage for the circuit of Fig. 2. In Fig. 3 the point E represents the potential of the negative terminal of source 12 with respect to the positive terminal of source 12. The line 40 represents the characteristic curve of indicators 10 and 30. It has been assumed that the characteristics of indicators 10 and 30 are identical in order to simplify the explanation of the operation of the circuit. However, it will be obvious to those skilled in the art that the invention will function as described even though the characteristics are not identical. In the characteristic assumed in Fig. 3 the potential between the two electrodes of the indicator varies from approximately 50 volts to approximately 57 volts as the current through the indicator changes from 100 microamperes to 375 microamperes. It is assumed that conduction ceases through the indicator at the 50 volt −100 microampere point. It will also be assumed that the striking voltage of the indicators is approximately 60 volts. These characteristics are not intended to describe a particular indicator but they do approximate characteristics of indicators which are commercially available.

Line 42 is a load line which represents the voltage drop through resistors 14 and 16 when indicator 10 is conducting. The point 44 at which line 42 intersects line 40 represents the operating current and voltage for indicator 10. The operating or conducting voltage of indicator 10 has been designated as $e_{10}$ in Fig. 3.

The potential between electrode 10a and the negative terminal of source 12 may be considered as the source of potential of the circuit including indicator 30 and resistor 32. This potential is designated $e_{10}+e_{16}$ in Fig. 3. A load line 46 may be drawn from the point $e_{10}+e_{16}$ on the voltage at a slope determined by the resistance of resistor 32. The value of resistor 32 is selected so that line 46 does not intersect line 40 but passes below the lower end of this characteristic curve. The fact that these lines do not intersect indicates that conduction cannot be maintained through indicator 30 if indicator 10 is conducting. Preferably $e_{10}+e_{16}$ is made less than $e_s$, the striking potential of indicators 10 and 30, so that indicator 30 cannot strike if indicator 10 is conducting. If $e_{10}+e_{16}$ is greater than $E_s$, indicator 30 would flicker although steady conduction through indicator 30 cannot be maintained if line 46 does not intersect the characteristic curve 40.

Assume for the moment that, when source 12 is connected to the circuit of Fig. 2, indicator 30 is the first to strike. This is possible since, if neither indicator is conducting, the full potential of source 12 appears across each indicator. Conduction through indicator 30 will stabilize at the point 48 at which load line 50, representing a load comprising the resistors 14 and 32 in series, intersects characteristic curve 40. The operating or conducting potential of indicator 30 is designated as $e_{30}$ in Fig. 3. The potential appearing across indicator 30 and resistor 32 may be considered to be the supply potential for the circuit including indicator 10 and resistor 16. This potential is designated $e_{30}+e_{32}$ in Fig. 3. The potential $e_{30}+e_{32}$ is made greater than the striking potential $e_s$ by proper choice of resistor 32. Therefore indicator 10 will strike even though indicator 30 is conducting. Once indicator 10 conducts, indicator 30 stops conducting for the reasons given above.

The above explanation assumes that transistor 20 appears as an open circuit. Assume now that a negative signal is supplied to the base of transistor 20. The transistor 20 will now appear as a low impedance between emitter and collector. This will maintain electrode 10b at approximately ground potential which is shown as E' in Fig. 3. The new supply potential for indicator 10 and resistor 14 becomes the potential between tap 18 and the positive terminal of source 12. This potential is designated as E' in Fig. 3. Load line 54 drawn from point E' represents the voltage drop in resistor 14. The fact that load line 54 does not intersect curve 40 demonstrates that conduction cannot be maintained through indicator 10 if transistor 20 holds electrode 10b at or near ground potential. The series circuit including resistors 14 and 32 and indicator 30 always receives the full supply potential of source 12 even though transistor 20 is energized. Therefore conduction will occur through indicator 30 if transistor 20 is conducting. The operating point for indicator 30 will be point 48 as before.

The characteristics of gaseous diode discharge devices vary widely with type, manufacturer, and history of use. Therefore it is not practical to specify limiting values for the various circuit elements for even one type of gaseous discharge device. However, by way of further illustration the specifications of an indicator circuit of the type shown in Fig. 2, which has been operated successfully from a direct coupled transistor bi-stable circuit, are given below:

| Component: | Type or size |
|---|---|
| Indicators 10 and 30 | NE51 |
| Transistor 20 | 2N47 |
| Resistor 14 | 100K |
| Resistor 16 | 10K |
| Resistor 32 | 75K |
| Source 12 _____volts | 85 |
| Postive terminal _____do | +45 |
| Negative terminal _____do | −40 |
| Base voltage (on) _____do | −0.35 |
| Base voltage (off) _____do | −0.03 |

As will be seen from the above description, a visual signal from indicator 10 indicates that transistor 20 appears as an open switch and a visual indication of indicator 30 indicates that transistor 20 appears as a closed switch. If block 22 represents a bi-stable circuit, a visual signal from indicator 10 may indicate that the left half of the bi-stable circuit is conducting and a visual signal from indicator 30 may indicate that the right half of the bi-stable circuit is conducting. If the bi-stable circuit 22 forms a part of a register in a binary computer, indicator 10 may be employed to register or indicate a zero and indicator 30 may be employed to indicate a one. Other uses for the novel circuit shown in Fig. 2 will occur to those skilled in the art. No means has been shown for disconnecting the circuits of Figs. 1 and 2 from the source 12 when no indication is desired. It will be obvious to one skilled in the art that a suitable switch may be inserted between resistor 16 and source 12 in Fig. 1 or between resistor 14 and source 12 in Fig. 1 or 2.

Figure 4:
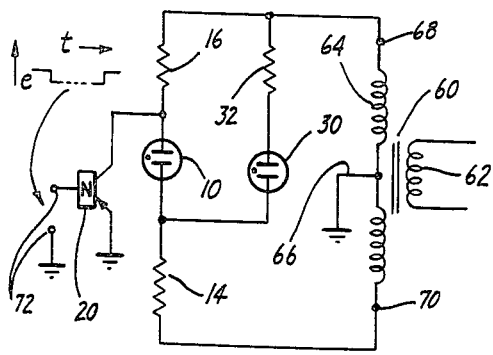
Fig. 4 is a schematic diagram of an indicator circuit employing two indicator lamps energized from an alternating current source.

The circuit shown in Fig. 4 is similar to the circuit of Fig. 2 except that an alternating current supply is provided in place of the D.-C. source 12. In Fig. 4 the alternating current supply is provided by transformer 60 which has a primary winding 62 and a secondary winding 64. Secondary winding 64 has a tap 66 which is connected to ground. Tap 66 corresponds to tap 18 on source 12 of Fig. 2. End terminal 68 of secondary winding 64 is connected to resistors 16 and 32. End terminal 70 is connected to resistor 14. Block 22 of Fig. 2 is not shown in Fig. 4. The means for supplying a signal to transistor 20 is schematically represented by the terminals 72.

Operation of the circuit of Fig. 4 from an A.-C. source is generally similar to the operation of the circuit of Fig. 2. However, one difference is introduced owing to the fact that transistor 20 will conduct if the collector is positive even though the base is connected to ground. Therefore, with a negative signal supplied to the base of transistor 20, indicator 10 will never conduct and indicator 30 will conduct with a glow on each electrode. However, if the base of transistor 20 is connected to ground, indicator 10 will conduct in one direction only so that only one electrode will glow. Since the current through indicator 10 will be higher than the current through indicator 30, the values of the circuit elements can be selected so that the glow on a single electrode of tube 10 is comparable to the combined glow of the two electrodes of indicator 30.

The circuit shown in Fig. 4 may also be employed as a small signal phase detector circuit. Only a relatively small signal is required to energize the base of transistor 20. If there is supplied to terminal 72 an A.-C. signal which is in phase with the voltage appearing across secondary winding 64, indicator 10 will not conduct and indicator 30 will conduct on both half cycles of the wave. If the signals supplied to terminal 72 is out of phase with the signal across secondary winding 64, indicator 10 will conduct on one-half cycle of the source voltage. Thus the condition of indicator 10 indicates whether the signal supplied to terminal 72 is in phase or out of phase with the supply voltage. A similar phase detector circuit may be constructed using the single indicator circuit of Fig. 1 with an A.-C. supply source.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

What is claimed is:

1. An indicator circuit comprising a source of electrical energy having first, second and third terminals, said third terminal being at a potential intermediate the potentials of said first and said second terminals, first and second diode gaseous discharge devices, a first resistor connected at one end to one electrode of said first gaseous discharge device and to one electrode of said second gaseous discharge device, the second end of said first resistor being connected to said first terminal of said source, a second resistor connected between a second electrode of said first discharge device and said second terminal of said source, said first resistor having a resistance which is much greater than the resistance of said second resistor, a third resistor connected between a second electrode of said second discharge device and said second terminal of said source, and means connected between said third terminal and said second electrode of said first gaseous discharge device, said means providing alternatively and selectively a relatively high impedance and a relatively low impedance between said points of connection thereof, said second resistor having a resistance much greater than the low impedance presented by said last mentioned means, the maximum potential between said first terminal and second terminal of said source being greater than the striking potential of either of said gaseous discharge devices.

2. An indicator circuit as recited in claim 1 wherein the maximum potential between said first terminal and said third terminal and between said second terminal and said third terminal is less than the striking potential of said first gaseous discharge device and the maximum potential between said first terminal and said second terminal is greater than the striking potential of either said first or said second gaseous discharge devices.

3. An indicator circuit comprising a source of electrical energy having first, second and third terminals, said third terminal being at a potential intermediate the potentials of said first and said second terminals, first and second diode gaseous discharge devices, a first resistor connected at one end to one electrode of said first gaseous discharge device and to one electrode of said second gaseous discharge device, the second end of said first resistor being connected to said first terminal of said source, a second resistor connected between a second electrode of said first discharge device and said second terminal of said source, a third resistor connected between a second electrode of said second discharge device and said second terminal of said source, said first resistor having a resistance much larger than the resistance of said second resistor, and means connected between said third terminal and said second electrode of said first gaseous discharge device, said means providing alternatively and selectively a relatively high impedance and a relatively low impedance between said points of connection thereof, the maximum potential between said first and second terminals of said source being greater than the striking potential of either of said gaseous discharge devices, said first and third resistors having values such that the sum of the operating potential of said second gaseous discharge device and the voltage drop across said third resistor resulting from the flow therethrough of the operating current of said second gaseous discharge device is greater than the striking potential of said first gaseous discharge device, said third resistor being further limited to a value such that the voltage drop thereacross resulting from the flow therethrough of a current equal to the extinction current of said second gaseous discharge device is greater than the difference between the extinction potential of said second gaseous discharge device and the sum of the operating potential of said first gaseous discharge device and the voltage drop across said second resistor, the potential of said third terminal and the impedance of said second resistor being such that the potential between said second electrode of said first gaseous discharge device and said first terminal of said source when said means presents a low impedance is less than the value which will sustain conduction through said first gaseous discharge device and said first resistor.

4. An indicator circuit comprising a source of electrical energy having first, second and third terminals, said third terminal being at a potential intermediate the potentials of said first and said second terminals, first and second diode gaseous discharge devices, a first resistor connected at one end to one electrode of said first gaseous discharge device and to one electrode of said second gaseous discharge device, the second end of said first resistor being connected to said first terminal of said source, a second resistor connected between a second electrode of said first discharge device and said second terminal of said source, a third resistor connected between a second electrode of said second discharge device and said second terminal of said source, said first and said third resistors having resistances which are much larger than the resistance of said second resistor, and means connected between said third terminal and said second electrode of said first gaseous discharge device, said means providing alternatively and selectively a relatively high impedance and a relatively low impedance between said points of connection thereof, the maximum potential between said first and second terminals of said source being greater than the striking potential of either of said gaseous discharge devices, said first and third resistors having values such that the sum of the operating potential of said second gaseous discharge device and the voltage drop across said third resistor resulting from the flow therethrough of the operating current of said second gaseous discharge device is greater than the striking potential of said first gaseous discharge device, said first and second resistors having a value such that the sum of the operating potential of said first gaseous discharge device and the voltage drop across said second resistor is less than the striking potential of said second gaseous discharge device, said third resistor being further limited to a value such that the voltage drop thereacross resulting from the flow therethrough of a current equal to the extinction current of said second gaseous discharge device is greater than the difference between the extinction potential of said second gaseous discharge device and the sum of the operating potential of said first gaseous discharge device and the voltage drop across said second resistor with said means presenting a high impedance, the potential of said third terminal and the impedance of said second resistor being such that the potential between said second electrode of said first gaseous discharge device and said first terminal of said source when said means presents a low impedance is less than the value which will sustain conduction through said first gaseous discharge device and said first resistor.

5. An indicator circuit comprising a source of electrical energy having first, second and third terminals, said third terminal being at a potential intermediate the potentials of said first and said second terminals, first and second diode gaseous discharge devices, a first resistor connected at one end to one electrode of said first gaseous discharge device and to one electrode of said second gaseous discharge device, the second end of said first resistor being connected to said first terminal of said source, a second resistor connected between a second electrode of said first discharge device and said second terminal of said source, a third resistor connected between a second electrode of said second discharge device and said second terminal of said source, said first and said third resistors having resistances which are much larger than the resistance of said second resistor, and a transistor having an emitter, a collector and a base, the emitter-collector circuit of said transistor being connected between said third terminal and said second electrode of said first gaseous discharge device, the maximum potential between said first terminal and said third terminal and between said second terminal and said third terminal being less than the striking potential of said first gaseous discharge device and the maximum potential between said first terminal and said second terminal being greater than the striking potential of either said first or said second gaseous discharge device, said first and third resistors having values such that the sum of the operating potential of said second gaseous discharge device and the voltage drop across said third resistor resulting from the flow therethrough of the operating current of said second gaseous discharge device is greater than the striking potential of said first gaseous discharge device, said first and second resistors having a value such that the sum of the operating potential of said first gaseous discharge device and the voltage drop across said second resistor is less than the striking potential of said second gaseous discharge device, said third resistor being further limited to a value such that the voltage drop thereacross resulting from the flow therethrough of a current equal to the extinction current of said second gaseous discharge device is greater than the difference between the extinction potential of said second gaseous discharge device and the sum of the operating potential of said first gaseous discharge device and the voltage drop across said second resistor with said transistor in a non-conducting state, the potential of said third terminal and the impedance of said second resistor being such that the potential between said second electrode of said first gaseous discharge device and said first terminal of said source when said transistor is in a conducting state is less than the value which will sustain conduction through said first gaseous discharge device and said first resistor, said last-mentioned value being less than the striking potential of said first gaseous discharge device.

References Cited in the file of this patent

UNITED STATES PATENTS

| | | |
|---|---|---|
| 2,697,178 | Isborn | Dec. 14, 1954 |
| 2,697,825 | Lord | Dec. 21, 1954 |
| 2,772,410 | Logue et al. | Nov. 27, 1956 |
| 2,774,960 | Podill | Dec. 10, 1956 |